United States Patent [19]

Bindel et al.

[11] Patent Number: 4,465,287

[45] Date of Patent: Aug. 14, 1984

[54] CYLINDER-HEAD GASKET FOR PISTON-TYPE INTERNAL COMBUSTION ENGINES

[75] Inventors: Rudolf Bindel, Grafenberg; Wilhelm Kullen, Hülben, both of Fed. Rep. of Germany

[73] Assignee: Elring Dichtungswerke GmbH, Fellbach, Fed. Rep. of Germany

[21] Appl. No.: 491,529

[22] Filed: May 4, 1983

[30] Foreign Application Priority Data

May 8, 1982 [DE] Fed. Rep. of Germany ....... 3217329

[51] Int. Cl.³ .............................................. F16J 15/12
[52] U.S. Cl. ............................... 277/235 B; 277/184; 277/DIG. 6
[58] Field of Search ........... 277/235 R, 235 A, 235 B, 277/DIG. 6, 182–184

[56] References Cited

U.S. PATENT DOCUMENTS 1,974,633  9/1934  Victor .......................... 277/235 B X
3,841,289  10/1974  Meyers ........................ 277/235 B X

FOREIGN PATENT DOCUMENTS 1264900  3/1968  Fed. Rep. of Germany ... 277/235 B
1264901  3/1968  Fed. Rep. of Germany ... 277/235 B
2736599  2/1979  Fed. Rep. of Germany ... 277/235 B

*Primary Examiner*—Robert S. Ward
*Attorney, Agent, or Firm*—Richards & Geier

[57] ABSTRACT

In a cylinder-head gasket defining a sealing plane, and including at least a soft sheet of material made of a highly elastic layer of graphite, and formed with an opening serving as a fuel chamber passage, and wherein a sheet metal collar covers a rim of the layer bordering said opening, the improvement includes the sheet metal collar forming a single flange extending for the greater part thereof parallel to the sealing plane, and terminating near the edge of the said rim facing away from the said sealing plane.

7 Claims, 8 Drawing Figures

CYLINDER-HEAD GASKET FOR PISTON-TYPE INTERNAL COMBUSTION ENGINES

BACKGROUND OF THE INVENTION

1. Field of the Invention

The invention relates to a cylinder-head gasket defining a sealing plane, and including at least a soft sheet of material made of a highly elastic layer of graphite, and formed with an opening serving as a fuel chamber passage, and wherein a sheet metal collar clamp extends along a rim of the layer bordering the opening.

2. Description of the Prior Art

Conventional cylinder-head gaskets consist of a sheet metal, which on both sides thereof is generally provided with a rubber-bonded asbestos-fiber soft-material layer so as to constitute a sealing plate. Such a sealing plate is formed with a plurality of openings in the form of one or several fuel chamber passages, as well as with openings for passage of oil and of a coolant. In the case of the fuel passages, a U-shaped sheet metal collar clamp extends at least along the rim bordering the opening.

The development of engines of constantly increasing output and of light-weight construction has led to some engine parts being subjected to increased stresses. Moreover, these engine parts are deformable, namely, they are deformed elastically during assembly and operation of the engine.

This development has led to the need of cylinder-head gaskets, which require easily deformable and highly elastic soft material layers, so that the cylinder head bolts need not be tightened too strongly. The integrity of the cylinder head gasket is therefore ensured, in spite of any deformations of engine parts required to be sealed with respect to one another.

If the conventional and generally horizontally disposed U-shaped sheet metal collar clamps are transferred from conventional metal-asbestos cylinder-head gaskets to cylinder-head gaskets with highly elastic soft material layers, then, due to bending along transition regions between the two flanges overlapping the sealing plate and the portion of the sheet metal collar clamp which borders the fuel chamber, there arise permanent fractures in such transition regions. Such fractures occur to an even higher degree, when cylinder head gaskets are used with highly elastic soft material layers, than in the case of metal-asbestos cylinder-head gaskets. The higher the elasticity of the soft material layers, the higher is the oscillation load to which these sheet metal collar clamps are subjected.

As there is a risk of permanent fracture occurring even in conventional metal-asbestos cylinder-head gaskets, the sheet metal collar clamps for the fuel chamber passages have already been made in two parts. A kind of collet is formed on one flange of the sheet metal collar clamp, which borders the fuel chamber passage, and is made to overlap with a similar collet of the other flange (see German patent DE-OS No. 2236622). The considerably increased cost of manufacture of the cylinder-head gasket, is, however, a disadvantage of this embodiment.

SUMMARY OF THE INVENTION

It is therefore an object of the present invention to meet the urgent demand for cylinder-head gaskets having highly elastic soft material layers and a long service life. Starting from a cylinder-head gasket, including at least one soft sheet of material formed by a highly elastic graphite layer, as well as having at least one opening forming a fuel chamber passage, and wherein a sheet metal collar clamp extends along a rim region of the graphite layer, this object is attained, according to the invention, by using a sheet metal collar clamp employing only a single flange extending parallel to the sealing plane; this collar clamp substantially terminates near edge of the said rim facing away from the said sealing plane.

In a cylinder-head gasket it is known to use highly elastic graphite layers of so-called expanding or expandable graphite. Graphite layers of this type are preferred as elastic soft material sheets because of their temperature resistance. Furthermore use of such graphite layers makes it possible to manufacture a cylinder head gasket which is free from any asbestos fibers.

A sheet metal collar clamp for a fuel passage, according to the present invention, has the advantage that while it only has a single flange, it nevertheless shields and encloses the border of the fuel chamber passage along which the soft sheet of material extends, and so defines the fuel chamber unambiguously. On the other hand, it is free from a transition region prone to fracture; when the known U-shaped metal sheet collar clamp is manufactured with two flanges, such a transition region arises between at least one of the two flanges and a portion of the clamp connected thereacross. Finally the inventive cylinder head gasket may be produced in a cost-effective manner; this is so because the metal sheet collar clamp need only be stamped out, and a collar be formed thereon with the aid of a conventional drawing tool, while the manufacturing step of reversing an end of the collar, so as to form a second flange thereon, may be dispensed with.

If the inventive cylinder-head gaskets make use of a carrier, such as a conventional carrier metal sheet, then the highly elastic soft material sheets can be glued to the carrier; but it is also possible to stamp out anchoring lugs from a carrier sheet metal, to bend them upwards at an angle from the plane of the carrier, and to subsequently roll on the soft material sheets onto the carrier sheet metal.

In lieu of expanded graphite, basically also other highly elastic soft materials may be used, without the need to dispense with the advantages realizable with the present invention.

Advantageously, the sheet metal collar clamps are anchored to the highly elastic soft material sheets by pressing, for example, their collar passing through the fuel chamber passage with its free edge several tenths of millimeters into the sheet of soft material, so that a type of clamping effect occurs. Such pressing-in into the sheet of the soft material can be accomplished either along the entire edge of the collar, or there can be provided, for example, along the edge of the collar, tongue-like projections, which overlap the opening edge of the soft material sheet. Alternately or additionally, the flange of the sheet metal collar clamp can be attached by gluing, riveting, point-welding and the like to the sealing plate.

Other objects and features of the present invention will become apparent from the following detailed description considered in connection with the accompanying drawings, which disclose several embodiments of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views.

DESCRIPTION OF THE PREFERRED EMBODIMENTS

Figure 1:
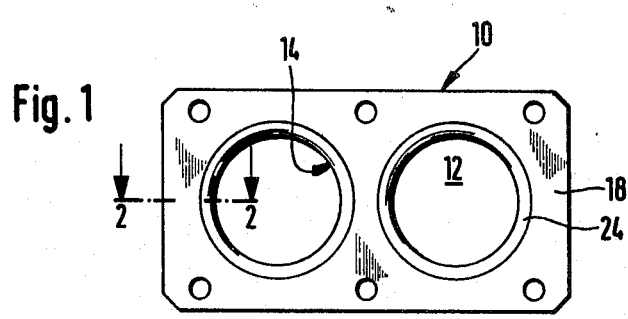
FIG. 1 is a plan view of the side of the inventive cylinder-head gasket onto which the flanges of the metal sheet collar-clamp abut.

A cylinder-head gasket shown in FIG. 1 is provided with two fuel passages 12, which are formed by (non-illustrated) openings in the sealing plate proper. The sealing plate proper is made up of a sheet metal 20 and two highly elastic soft sheets of material 16 and 18, which are formed into a single unit by anchoring prongs 22 stamped and bent out from the carrier sheet metal. But it would also be possible to glue the sheets of soft material to the carrier sheet metal, for example. The rims 28 of the fuel chamber forming the openings of the sealing plate are enclosed by the sheet metal collar clamps 14, each being made of an annular flange 24 and a collar 26. The annular flange 24 flatly abuts the lower soft material sheet 18, after the collar 26 thereof extending along the rim 28 of the opening has been slightly pressed into the upper edge 30 of the upper soft sheet of material 16; this results in a clamping effect of the sheet metal collar clamp 14 being held onto the cylinder-head gasket. Upon tightening of the cylinder-head screws, the flange 24 is pressed into the lower soft material sheet 18, so that there results an improved compression of the soft material sheet within the region of the fuel chamber passages 12.

Figure 2:
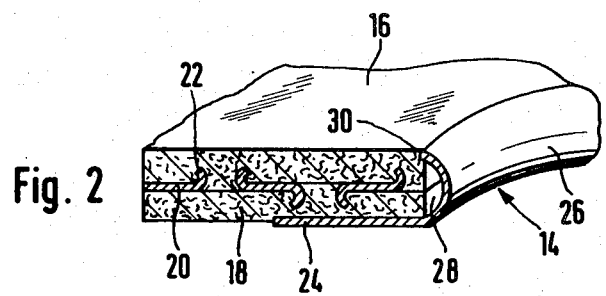
FIG. 2 is a perspective view in part cross-section along the line 2—2 of FIG. 1 of a first embodiment of the invention.

The embodiments of FIGS. 3 to 8 will be explained in what follows only to the extent that they deviate from the embodiment of FIG. 2.

Figure 3:
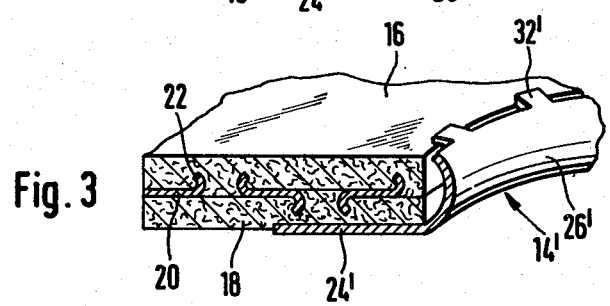
FIG. 3 is a perspective view in part cross-section along the line 2—2 of FIG. 1 of a second embodiment of the invention.

In the embodiment according to FIG. 3, the sheet metal collar clamp 14' with its annular flange 24' and collar 26' is formed on its upper rim with several prongs 32' spaced from one another, by means of which the sheet metal collar clamp 14' and its annular flange 24' are clamped onto the sealing plate.

Figure 4:
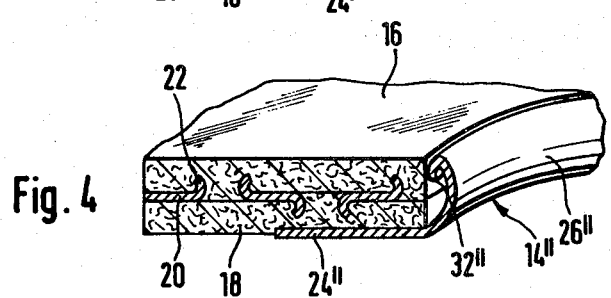
FIG. 4 is a perspective view in part cross-section along the line 2—2 of FIG. 1 of a third embodiment of the present invention.
Figure 5:
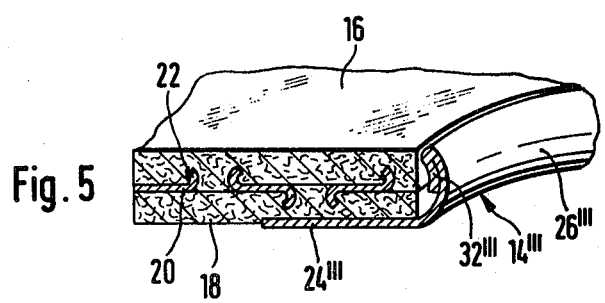
FIG. 5 is a perspective view in part cross-section along the line 2—2 of FIG. 1 of a fourth embodiment of the present invention.

The sheet metal collar clamp 14'' of the embodiment according to FIG. 4 is formed near the upper rim of the collar 26'' with a hook-like portion 32'' bent back on itself, which has the advantage that it stabilizes the upper rim of the collar 26'', and which may be pressed into the upper soft sheet of material 16 for anchoring the sheet metal collar clamp. But it is also possible to secure the sheet metal collar clamp to the lower soft sheet of material 18 by attaching the flange 24'' thereto, for example, by gluing. This can be done in a similar manner for the embodiment according to FIG. 5, in which the sheet metal collar clamp 14''' is partially formed in two layers, by folding back a region 32''' onto the collar 26'''.

Figure 6:
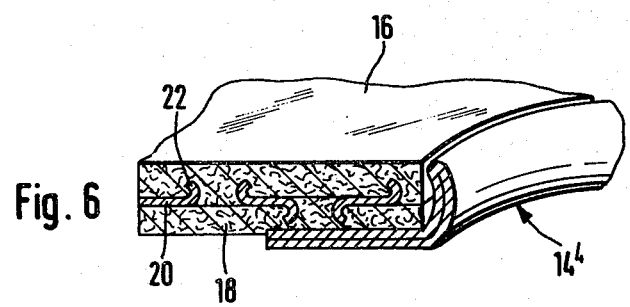
FIG. 6 is a perspective view in part cross-section along the line 2—2 of FIG. 1 of a fifth embodiment of the present invention.

In FIG. 6, there will be seen throughout a two-layer sheet metal collar clamp $14^4$, which has the advantage, that the transition between the flange $24^4$ and the collar $26^4$ is stiffened, and is therefore more stable.

Figure 7:
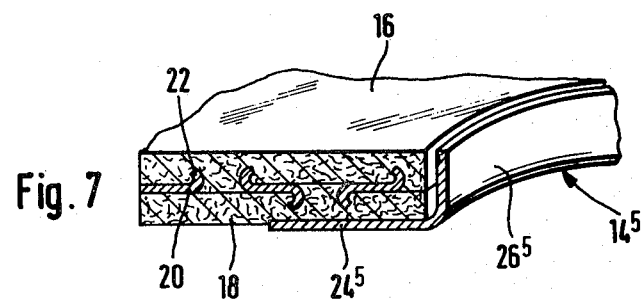
FIG. 7 is a perspective view in part cross-section along line 2—2 of FIG. 1 of a sixth embodiment of the present invention.

Under certain circumstances it is particularly advantageous to make use of a sheet metal collar clamp $14^5$, as shown in FIG. 7, whose cross-section consists approximately of two straight wings subtending substantially a right angle therebetween, and wherein the wings are connected by a relatively small transition radius. The collar $26^5$ of that version is consequently not arcuate, can therefore be manufactured more simply than an arcuate collar, and any buckling of the transition zone between the flange $24^5$ and the collar $26^5$ is avoided. Such buckling would have occurred, if the collar $26^5$ had been made arcuate, as has been the case in the embodiments of the prior art. Furthermore, in the present embodiment any disturbing clearance in the fuel chamber passage is minimized.

Figure 8:
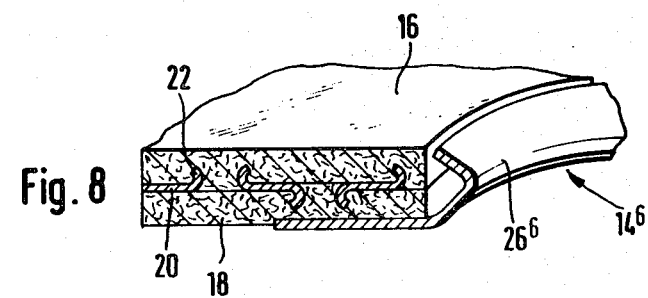
FIG. 8 is a perspective view in part cross-section of a seventh embodiment of the present invention.

In the embodiment according to FIG. 8, the collar $26^6$ of the sheet metal collar clamp $14^6$ has an approximately V-shaped or U-shaped cross-section, and the wings thereof, as seen in cross-section, do not extend parallel to one another. A sheet metal collar clamp of this type is particularly elastic and suitable to conform to any opening.

It should be noted that in the case of cylinder-head gaskets using conventional soft sheet material, which include asbestos fibers interspersed with binding means, there have already become known sheet metal collar clamps for fuel chamber passages, which are formed with the conventional U-shaped cross-section within the region of the fuel chamber passages, but wherein tongue-like lugs are formed on one flange of the sheet metal collar clamp. Sheet metal collar clamps of this type give rise to openings adjacent to the fuel chamber passage for passing of water or of pressurized oil therethrough. Within the region of the water or pressurized oil-openings, these known sheet metal collar clamps, although formed with only a single flange and a collar engaging the corresponding opening, neither anticipate, suggest, nor can properly be compared to the sheet metal collar clamps for fuel chamber passages according to the present invention. The aforesaid sheet metal collar clamps do not solve the problem to which the present invention has addressed itself, nor are they stressed to the same degree as those of the present invention. It is thus conclusively believed that the present invention is neither anticipated nor suggested by the aforesaid sheet metal collars clamps of the prior art.

Thus, while only several embodiments of the present invention have been shown and described, it is obvious that many changes and modifications may be made thereunto, without departing from the spirit and scope of the invention.

What is claimed is:

1. A cylinder-head gasket defining a sealing plane, comprising in combination at least a soft sheet of material made of a highly elastic layer of graphite, and formed with an opening serving as a fuel chamber passage, a sheet metal collar clamp extending along a rim of said layer bordering said opening, and including a single flange extending for the greater part thereof parallel to said sealing plane, and terminating near an edge of said rim facing away from said sealing plane.

2. The cylinder-head gasket as claimed in claim 1, wherein the cross-section of said sheet metal collar clamp is substantially L-shaped, the portion of said metal sheet collar clamp covering the rim of said layer bordering said opening being convex as viewed from the center of said opening.

3. The cylinder-head gasket as claimed in claim 1, wherein the cross-section of said sheet metal collar clamp is substantially L-shaped, two wings thereof forming substantially a right angle subtending a relatively small transition radius therebetween.

4. The cylinder-head gasket as claimed in claim 1, wherein said sheet metal collar clamp includes lugs overlapping an edge of said rim of said layer of graphite.

5. The cylinder-head gasket as claimed in claim 1, wherein the cross-section of said sheet metal collar clamp has a hook-like portion bent back on itself within a region of an edge of said rim of said layer of graphite, and faces towards said flange.

6. The cylinder-head gasket as claimed in claim 1, wherein the cross-section of said sheet metal collar clamp is bent back on itself within a region of an edge of said rim of said layer of graphite.

7. The cylinder-head gasket as claimed in claim 2, wherein said sheet metal collar clamp has a plurality of layers.

* * * * *